ated Oct. 8, 1974

United States Patent Office 3,840,538
Patented Oct. 8, 1974

3,840,538
1-(4',6'-DICHLORO-s-TRIAZIN-2-YLCARBAMOYL)-2-METHOXYCARBONYLAMINO-BENZIMIDAZOLE
Adolf Hubele, Magden, Switzerland, assignor to Ciba-Geigy Corporation, Ardsley, N.Y.
No Drawing. Filed Apr. 4, 1973, Ser. No. 347,739
Claims priority, application Switzerland, Apr. 10, 1972, 5,209/72
Int. Cl. C07d 55/18
U.S. Cl. 260—249.5    1 Claim

ABSTRACT OF THE DISCLOSURE

1 - (4',6'-dichloro-s-triazin-2-ylcarbamoyl)-2-methoxycarbonylamino-benzimidazole is disclosed as well as pesticidal agents containing it and its use as a pesticide.

---

The present invention relates to 1-(4',6'-dichloro-s-triazin - 2'-ylcarbamoyl)-2-methoxycarbonylamino-benzimidazole as pesticide, to a process for its production, and to its use for pest control.

The active substance has the following formula

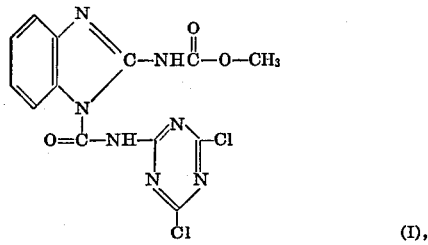

(I), and can be advantageously produced by the process in which a benzimidazolecarbamic acid ester of the formula

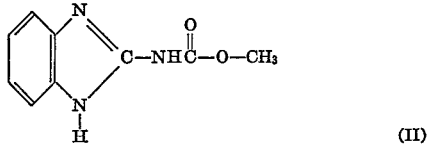

(II)

is reacted with an isocyanate of the formula

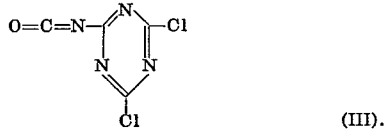

(III).

The reaction is preferably performed in the presence of solvents. Suitable for this purpose are inert solvents such as liquid hdyrocarbons (alkanes, benzene, xylene or toluene), ethyl acetate, dioxane, tetrahydrofuran, chlorobenzenes, nitrobenzene, cymol, and so forth.

The compounds of formulae II and III are known and can be produced by methods known per se; for example, by the methods described in the Belgian Patent Specification No. 742,452, or in J. Org. Chem., 27, 3742 (1962).

The compound of formula I has a broad biocidal action and can be used for the control of various plant and animal pests.

It is suitable for the control of bacteria and fungi. The said compound possesses, in particular, fungicidal properties rendering it effective against phytopathogenic fungi on a wide variety of cultivated plants and crops, such as cereals, maize, rice, vegetables, ornamental plants, fruit trees, grape vines and field crops.

It is possible with this active substance to check or destroy fungi occurring on plants or on parts of plants (fruits, blossoms, foliage, stalks, tubers or roots), whereby parts of plants subsequently sprouting remain immune from such fungi. The active substance is particularly effective against phytopathogenic fungi belonging to the following classes: Ascomycetes, Basidiomycetes, Phycomycetes or Fungi Imperfecti such as Piricularia spp., *Fusarium oxysporum* or *Fusarium nivale*.

The new active substances can moreover be employed for the treatment of seeds, fruits, tubers, etc., to provide protection against fungus infections; for example, against smuts, such as ustilaginales.

The compounds of formula I can be formulated with other fungicides, bactericides, fungistatics or bacteriostatics in various mixture ratios, with synergistically intensified effects being in some cases obtained.

Furthermore, the compound of formula I possesses nematicidal properties, and can be used for the control of phytoparasitic and of endoparasitic nematodes. The endoparasitic species include, for example, the ascaridae, trichistrongylidae, ancylostomatidae and strongylidae.

The advantage of this compound lies in its favourable toxicity towards warm-blooded animals and in its degree of effectiveness with low dosage amounts. Domestic and productive animals such as cattle, sheep, goats, pigs, horses, poultry, cats and dogs can be treated with the active substance of formula I where nematode infestation in the gastrointestinal tract occurs.

The active substance can be administered in the form of an agent to the animals, the required amount being administered either as a single dose or as repeated doses, whereby the single doses, depending on the species of animal, are preferably between 5 and 1000 mg. of active substance per kilogram of body weight. A better action is obtained in some cases by a protracted administration or smaller overall doses may suffice. The active-substance mixtures moreover can be added to the feed or to the drinking water of the animals. The prepared final feed contains the active substance of formula I preferably in a concentration of ca. 0.05 to 1.0 percent by weight.

The compound of formula I can be used on its own or together with suitable carriers and/or additives. Suitable carriers and additives may be solid or liquid, and correspond to the substances common in formulation practice, such as, e.g. natural and regenerated substances, solvents, dispersing agents, wetting agents, adhesives, thickeners, binders and/or fertilisers.

The agents according to the invention are produced in a manner known per se by the intimate mixing and/or grinding of the active substance of formula I with suitable carriers, optionally with the addition of dispersing agents or solvents which are inert to the active substances. The active substances can be obtained and used in the following forms:

solid preparations: dusts, scattering agents, granulates, coated granulates, impregnated granulates and homogeneous granulates;
liquid preparations:
    (a) water-dispersible active-substance concentrates: wettable powders, pastes and emulsions;
    (b) solutions.

The solid preparations (dusts, scattering agents) are produced by the mixing of the active substances with solid carriers. Suitable carriers are, e.g. kaolin, talcum, bole, loess, chalk, limestone, ground limestone, attapulgite, dolomite, diatomaceous earth, precipitated silicic acid, alkaline-earth silicates, sodium and potassium aluminium silicates (feldspar and mica), calcium and magnesium oxide, ground synthetic materials, fertilisers such as ammonium sulphate, ammonium phosphate, ammonium nitrate, urea, ground vegetable products such as bran, bark dust, sawdust, ground nutshells, cellulose powder, residues of plant extracts, active charcoal, etc., singly or in admixture with each other.

Granulates can be very easily prepared by a process in which an active substance of formula I is dissolved in an organic solvent, the thus obtained solution applied to a granulated mineral, e.g. attapulgite, $SiO_2$, granicalcium, bentonite, etc., and the organic solvent then evaporated off.

It is also possible to produce polymer granulates by impregnation of the finished porous polymer granulates (urea/formaldehyde, polyacrylonitrile, polyesters and others), having a specific surface area and favourable predeterminable adsorption/desorption ratio, with the active substance, e.g. in the form of a solution in a low boiling solvent; and subsequent removal of the solvent. Polymer granulates of this kind can be also sprayed in the form of microgranulates, having bulk weights of preferably 300 g./litre to 600 g./litre, with the aid of spraying equipment. Spraying can be carried out over extensive areas of useful plant crops by the use of aeroplanes.

Granulates can also be obtained by the compacting of the carrier material with the active substances and additives, and a subsequent particle-size-reducing operation.

Furthermore, it is possible to add to these mixtures additives stabilising the active substance and/or nonionic, anion-active and cation-active substances which improve, e.g. the adhesiveness of the active substances on plants and parts of plants (adhesives and agglutinants), and/or ensure a better wettability (wetting agents), as well as dispersibility (dispersing agents).

The following substances are, for example, suitable: olein/lime mixture, cellulose derivatives (methyl cellulose, carboxymethyl cellulose), hydroxyethylene glycol ethers of monoalkyl and dialkyl phenols having 5 to 15 ethylene oxide radicals per molecule and 8 to 9 carbon atoms in the alkyl radical, ligninsulphonic acid, the alkali metal and alkaline-earth metal salts thereof, polyethylene glycol ethers (Carbowaxes), fatty alcohol polyglycol ethers having 5 to 20 ethylene oxide radicals per molecule and 8 to 18 carbon atoms in the fatty alcohol moiety, condensation products of ethylene oxide, propylene oxide, polyvinylpyrrolidones, polyvinyl alcohols, condensation products of urea and formaldehyde, as well as latex products.

Water-dispersible concentrates of active substances, i.e. wettable powders, pastes and emulsion concentrates, are agents which can be diluted with water to obtain any desired concentration. They consist of active substance, carrier, optionally additives which stabilise the active substance, surface-active substances, and anti-foam agents and, optionally, solvents.

The wettable powders and pastes are obtained by the mixing and grinding of the active substances with dispersing agents and pulverulent carriers, in suitable devices, until homogeneity is obtained. Suitable carriers are, e.g. those previously mentioned in the case of solid preparations. It is advantageous in some cases to use mixtures of different carriers. As dispersing agents it is possible to use, e.g.: condensation products of sulphonated naphthalene and sulphonated naphthalene derivatives with formaldehyde, condensation products of naphthalene or of naphthalenesulphonic acids with phenol and formaldehyde as well as alkali, ammonium and alkaline-earth metal salts of ligninsulphonic acid, also alkylarylsulphonates, alkali metal salts and alkaline-earth metal salts of dibutyl naphthalenesulphonic acid, fatty alcohol sulphates such as salts of sulphated hexadecanols, heptadecanols, octadecanols, and salts of sulphated fatty alcohol glycol ethers, the sodium salt of oleyl methyl tauride, ditertiary ethylene glycols, dialkyl dilauryl ammonium chloride, and fatty acid alkali-metal and alkaline-earth metal salts.

Suitable anti-foam agents are, e.g. silicone oils.

The active substance is so mixed, ground, sieved and strained with the above-mentioned additives that the solid constituent in the case of wettable powders has a particle size not exceeding 0.02 to 0.04 mm., and in the case of pastes not exceeding 0.03 mm. For the preparation of emulsion concentrates and pastes, dispersing agents, such as those mentioned in the preceding paragraphs, organic solvents and water are used. Suitable solvents are, e.g. alcohols, benzene, xylene, toluene, dimethylsulphoxide, and mineral oil fractions boiling in the range of 120 to 350° C. The solvents must be practically odourless, non-phytotoxic, and inert to the active substances.

Furthermore, the agents according to the invention can be used in the form of solutions; these are obtained by the dissolving of the active substance in suitable organic solvents or solvent mixtures. The organic solvents employed can be aliphatic and aromatic hydrocarbons, their chlorinated derivatives, alkylnaphthalenes or mineral oils on their own or in admixture with each other.

The content of active substance in the above described agents is between 0.1 and 95%.

If the active substance of formula I is to used for the control of endoparasites, then the appropriate agent can be administered in the form of solutions, emulsions, suspensions (drenches), powders, tablets, boluses and capsules to the animals orally or abomasally. These preparations are made up with the aid of the usual solid carriers, such as kaolin, talcum, bentonite, sodium chloride, calcium phosphate or cottonseed meal, or liquids such as oils that do not react with the active substances, or other solvents or diluents harmless to the animal organism. If water is to be employed as diluent for preparations such as, e.g. drenches or emulsions, or where the agents are to be administered in the form of feed concentrates, then it is necessary to ensure, by the use of a suitable protective formulation (e.g. coated granules), by embedding in hydrophobic materials (e.g. paraffin, silicone oils or waxes), or by absorbtion onto inert solid carriers such as kaolin, talcum, bentonite, kieselguhr or bolus alba, that no premature decomposition occurs. If the anthelmintic agents are in the form of feed concentrates, then the carriers used are, for example, production feed, fodder grain or protein concentrates. Such feed concentrates or agents may also contain, besides the active substances, additives such as vitamines, antibiotics, chemotherapeutics or other pesticides, particularly bacteriostatics, fungistatics, anthelmintics, coccidiostatics or other hormone preparations.

The active substance of formula I can be formulated, for example, as follows:

DUSTS

The following substances are used for the preparation of (a) a 5% dust, and (b) a 2% dust:

(a)

| | Parts |
|---|---|
| Active substance | 5 |
| Talcum | 95 |

(b)

| | Parts |
|---|---|
| Active substance | 2 |
| Highly dispersed silicic acid | 1 |
| Talcum | 97 |

The active substances are mixed and ground with the carriers.

GRANULATE

The following substances are use to produce a 5% granulate:

| | Parts |
|---|---|
| Active substance | 5 |
| Epichlorhydrin | 0.25 |
| Cetyl polyglycol ether | 0.25 |
| Polyethylene glycol | 3.50 |
| Kaolin (particle size 0.3–0.8 mm.) | 91 |

The active substance is mixed with epichlorhydrin and dissolved with 6 parts of acetone; the polyethylene glycol and cetyl polyglycol ether are then added. The thus obtained solution is sprayed on to kaolin, and the acetone subsequently evaporated in vacuo.

WETTABLE POWDER

The following constituents are used for the preparation of (a) a 40%, (b) and (c) a 25%, and (d) a 10% wettable powder:

(a)

| | Parts |
|---|---|
| Active substance | 40 |
| Sodium lignin sulphonate | 5 |
| Sodium dibutyl-naphthalene sulphonate | 1 |
| Silicic acid | 54 |

(b)

| | Parts |
|---|---|
| Active substance | 25 |
| Calcium lignin sulphonate | 4.5 |
| Champagne chalk/hydroxyethyl cellulose mixture (1:) | 1.9 |
| Sodium dibutyl naphthalene sulphonate | 1.5 |
| Silicic acid | 19.5 |
| Champagne chalk | 19.5 |
| Kaolin | 28.1 |

(c)

| | Parts |
|---|---|
| Active substance | 25 |
| Isooctylphenoxy-polyoxyethylene-ethanol | 2.5 |
| Champagne chalk/hydroxyethyl cellulose mixture (1:1) | 1.7 |
| Sodium aluminium silicate | 8.3 |
| Kieselguhr | 16.5 |
| Kaolin | 46 |

(d)

| | Parts |
|---|---|
| Active substance | 10 |
| Mixture of the sodium salts of saturated fatty alcohol sulphates | 3 |
| Naphthalenesulphonic acid/formaldehyde condensate | 5 |
| Kaolin | 82 |

The active substances are intimately mixed, in suitable mixers, with the additives, the mixtures being then ground in the appropriate mills and rollers. Wettable powders are obtained which can be diluted with water to give suspensions of any desired concentration.

EMULSIFIABLE CONCENTRATES

The following substances are used to produce (a) a 10% and (b) a 25% emulsifiable concentrate:

(a)

| | Parts |
|---|---|
| Active substance | 10 |
| Epoxidised vegetable oil | 3.4 |
| Combination emulsifier consisting of fatty alcohol polyglycol ether and alkylarylsulphonate calcium salt | 3.4 |
| Dimethylformamide | 40 |
| Xylene | 43.2 |

(b)

| | Parts |
|---|---|
| Active substance | 25 |
| Epoxised vegetable oil | 2.5 |
| Alkylarylsulphonate/fatty alcohol-polyglycol ether mixture | 10 |
| Dimethylformamide | 5 |
| Xylene | 57.5 |

From these concentrates it is possible to produce, by dilution with water, emulsions of any desired concentration.

SPRAY

The following constituents are used to prepare a 5% spray:

| | Parts |
|---|---|
| Active substance | 5 |
| Epichlorhydrin | 1 |
| Ligroin (boiling limits 160°–190° C.) | 94 |

WATER-DISPERSIBLE POWDER MIXTURE AS SUPPLEMENTARY FEED

| | Parts |
|---|---|
| Active substance | 25 |
| Mixture of polyoxyethylene/tall oil ester urea | 3 |
| Polyvinylpyrrolidone | 7 |
| Highly dispersed silicic acid | 31.5 |
| Bolus alba | 33.5 |

The active substance is homogeneously mixed with the polyoxyethylene/tall oil ester urea mixture and polyvinylpyrrolidone, with the addition of ca. 30% of the silicic acid constituent, in a planetry mixer. The remaining part of the silicic acid and the bolus alba are then added, and the whole mixed in suitable mixers to obtain homogeneity. The mixture is subsequently ground in a dowelled disc mill to reduce the particle size of the mixture to below 20 microns.

EXAMPLE 1

An amount of 23.2 g. of 2,4-dichloro-6-isocyanato-s-triazine in 50 ml. of ethyl acetate is added dropwise at 20° C. in the course of half an hour, with thorough stirring, to a suspension of 23.2 g. of 2-benzimidazolemethylcarbamate in 450 ml. of ethyl acetate, whereby the internal temperature increases by 4° C. After 15 hours' stirring, filtration is carried out and the obtained product subsequently washed with petroleum ether (B.P. 50–70° C.); melting point: 350° C.

EXAMPLE 2

Fungicidal action

Action against *Septoria apicola* Spegazzini on celery plants.—Celery of the "Challon" variety was grown in a greenhouse. Small plants, each fifteen centimeters tall, were sprayed dripping wet with a 0.05% liquor of the active substance, which had been prepared by the dissolving of a 25% wettable powder. After the drying of the applied coating, the plants were infested with a spore suspension of the fungus. There appeared signs of disease after 2 days' standing in a moist chamber and a further 12 days at 20–22° C. with 90% relative humidity in a greenhouse.

The number and extent of the points of infection served as an evaluation criterion for the effectiveness of the test substance. The results of this test and those of the following tests are given in the subsequent table.

Action against *Piccinia triticina* Erikss. on wheat.—Wheat plants, ten centimeters in length, were sprayed in a greenhouse until dripping wet with a 0.08% liquor of the active substance, which had been prepared by the addition of a 25% wettable powder to water. After the drying of the applied coating, the plants were uniformly infected with a uredospore suspension of the fungus. The occurring signs of disease were evaluated after 5 days' standing in a moist chamber and a further 12 days in a greenhouse at 20–22° C. with normal humidity. The number and extent of the points of infection served as the evaluation criterion for the effectiveness of the test substance.

Action against *Piricularia oryzae* Bri. et Cav. on rice.— Rice plants were grown in a greenhouse and sprayed once prophylactically with a 0.05% akueous liquor of the active substance. Two days later, the thus treated plants were infested with exospores of *Piricularia oryzae* Bri. and Cav., and, after 5 days of incubation in a moist chamber, examined for fungus infestation.

Action against *Botrytis cinerea* on *Vicia faba*.—In a spraying chamber, *Vicia faba* plants—ca. 10 cm. in height—were sprayed dripping wet with a spraying-liquor prepared from the active substance made up in the form of a 25% wettable powder. After the drying of the applied coating, the plants were infested with a conidiospore suspension of the fungus. Evaluation of the test followed after an incubation period of 3–4 days at 95–100% relative humidity and ca. 21° C.

Action against *Venturia inaequalis* on apple-tree cuttings.—Cutting, 20–30 cm. in height and with 6–8 leaves, were sprayed in a greenhouse until dripping wet with a 0.05% active-substance liquor. After the drying of the applied coating, the cuttings were infected with a conidiospore suspension of *Venturia inaequalis*. An evaluation of the test was made after 5 days at 20–24° C. with 95–100% relative humidity and a further 14 days at 20–24° C. with normal humidity.

Action against *Uromyces appendiculatus* on *Phaseolus vulgaris*.—Bean plants in the two-leaf stage were sprayed dripping wet with a 0.05% active-substance suspension. After the drying of the applied coating, the plants were infested with a fresh spore suspension of bean rust; and subsequently allowed to stand for one day in a moist chamber, and then for 12 days in a greenhouse at 20° C. under normal conditions. The number and extent of the occurring rust pustules served as a criterion for the evaluation of the effectiveness of the test substances.

Action against *Erysiphe graminis* D.C. on Hordeum.— (a) Residual action: Young barley plants, ca. 10 cm. in length, were sprayed in a greenhouse at 20° C. with an 0.05% active-substance liquor prepared from a 25% wettable powder. After the drying of the applied coating, the plants were infested with conidiospores of the fungus. The percentage infestation of the plants was determined after 12 days in a greenhouse at 20° C.

(b) Systemic action: Shortly after the emergence (monocotyledon stage) of barley plants in a greenhouse, a 0.05% suspension of the active substance was applied to them in such a manner that, while the plants themselves were not wetted, the resulting active-substance concentrations in the soil were designed to be 100 p.p.m., 50 p.p.m. and 25 p.p.m. After a standing time of 24–48 hours, the plants were infested by being dusted with fungus mycelium of *Erysiphe graminis* DC. (from infested barley stalks). An evaluation of the test was made after 10 days at 20–24° C. and normal humidity.

Action against *Erysiphe cichoracearum* on zucchetti plants.—(a) Residual action: Young zuccetti plants, after being sprayed with a 0.05% suspension of the active substance made up as a wettable powder, and after the drying of the applied coating, were sprayed with a spore suspension of the fungus. The plants were allowed to stand for 8 days in a greenhouse at ca. 23° C.; an assessment was then made of the degree of infestation (proportion of the leaf surface coated with mycelium) on the treated and infested leaves compared with that on the untreated but infested control leaves.

(b) Systemic action: Shortly after emergence (dioctyledon stage) in a greenhouse, zucchetti plants were treated with a 0.05% suspension of the active substance in such a manner that, while the plants themselves were not wetted, the active-substance concentration in the soil was selectively 100 p.p.m., 50 p.p.m. and 25 p.p.m. After a period of 24–48 hours, the plants were infested by being dusted with the fungus mycelium of *Erysiphe cichoracearum* (from infested zuccetti leaves). An evaluation of the test was made after 10 days at 20–24° C. and normal humidity.

In the tests described in Example 2, no fungus infestation was detected with use of the following active-substance concentrations:

| Fungus | Residual action, p.p.m. of AS in sprayliquor with application to leaves | Systemic action, p.p.m. of AS relative to volume of soil with application to soil |
|---|---|---|
| Septoria apicola | 250 | |
| Puccinia triticina | 250 | |
| Piricularia oryzae | 500 | |
| Botrytis cinerea | 500 | |
| Venturia inaequalis | 250 | |
| Uromyces phaseoli | 500 | |
| Erysiphe graminis | 250 | 25 |
| Erysiphe cichoracearum | 250 | 25 |

EXAMPLE 3

Action against soil fungi

An amount of 30 g. of dry sieved soil was placed into Petri dishes, 5 cm. in diameter and 1.5 cm. in height, and moistened with an active-substance solution so that the soil contained 500 p.p.m. and 250 p.p.m., respectively, of active substance. About 5 oat grains covered with fungus mycelium were placed into the thus prepared soil at the centre of the Petri dish. The Petri dish was loosely covered with a second dish and allowed to stand for 10 days at 20–24° C. under normal conditions. The evaluation made was with regard to the growth of fungus mycelium occurring during the standing period of the effected inhibition of growth.

With application of the active substance according to the invention, the fungus growth of *Rhizoctonia solani* was completely arrested in the case of 500 p.p.m. and in the case of 250 p.p.m.

EXAMPLE 4

Action as dressing agent

Oat seeds sterilised at 120° C. in an autoclave are used in a 300 ml. Erlenmeyer flask as nutrient medium for *Fusarium nivale*. A few days later, the formed mycelium is shaken out with water and employed as an infection solution for the wheat grains used in the actual active substance test. An amount of 100 g. of the thus wetted and then dried wheat is shaken in a 1-litre flask with 0.2 g. of dry wettable powder (25% active substance content) until this is distributed over the entire surface of the wheat grains. Two lots of 25 prepared grains are then placed on a solidified agar layer, 8 mm. thick and slightly coloured with cotton blue, in a Petri dish. An evaluation is made after 3 days on the basis of the areola formation of the fungus mycelium.

With the compound according to the invention there occurred on application of an amount of active substance of 500 p.p.m. (relative to 100 g. of seed) complete inhibition of fungus growth.

EXAMPLE 5

Action against nematodes

The active substance was administered in the form of a suspension, by stomach probe, to white mice infested with mouse oxyuris. Five animals were used for each test. The active substances were administered to each group of animals once daily on three successive days.

The daily dose per animal was 100 mg. of active substance per kg. of body weight.

On the sixth day after commencement of the treatment, the animals were killed and dissected. The evaluation of the results after dissection of the test animals was on the basis of the number of mouse oxyuris present in the intestines; unreacted but similarly infested mice were used as a control.

| Active substance | Infestation of the 5 test mice on dissection | Infestation of the control mice on dissection |
|---|---|---|
| 1-(4',6'-dichloro-s-triazin-2'-yl-carbamoyl)-2-methoxycarbonyl-aminobenzimidazole | 0—0—0 0—0 | 4-8-11-13 |

What is claimed is:

1. 1-(4',6'-dichloro - triazin - 2' - ylcarbamoyl)-2- methoxy carbonylamino-benzimidazole having the formula

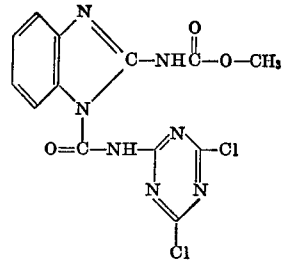

References Cited
UNITED STATES PATENTS 3,794,641   2/1974   Gorog et al. _____ 260—249.5

JOHN M. FORD, Primary Examiner

U.S. Cl. X.R.

424—249